United States Patent
Cheng

(10) Patent No.: US 11,494,894 B2
(45) Date of Patent: Nov. 8, 2022

(54) LENS MATCHING APPARATUS AND LENS MATCHING METHOD

(71) Applicant: Acer Incorporated, New Taipei (TW)

(72) Inventor: Chen-Ju Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 271 days.

(21) Appl. No.: 17/000,356

(22) Filed: Aug. 23, 2020

(65) Prior Publication Data

US 2021/0192706 A1 Jun. 24, 2021

(30) Foreign Application Priority Data

Dec. 19, 2019 (TW) ................. 108146788

(51) Int. Cl.
*G06T 7/00* (2017.01)
*G06K 9/62* (2022.01)
*G06V 10/75* (2022.01)

(52) U.S. Cl.
CPC ............. *G06T 7/001* (2013.01); *G06K 9/627* (2013.01); *G06V 10/751* (2022.01); *G06T 2207/10024* (2013.01); *G06T 2207/30108* (2013.01)

(58) Field of Classification Search
CPC ........... G06T 7/001; G06T 2207/10024; G06T 2207/30108; G06K 9/627; G06V 10/751; G06V 10/758; H04N 13/243; H04N 5/23212; H04N 13/128
See application file for complete search history.

(56) References Cited

U.S. PATENT DOCUMENTS

| | | | | |
|---|---|---|---|---|
| 5,303,023 A | * | 4/1994 | Portney | G01M 11/0285 356/124.5 |
| 5,726,746 A | * | 3/1998 | Park | G01M 11/0292 356/124.5 |
| 6,788,401 B1 | * | 9/2004 | Kitabayashi | G01M 11/0292 356/124 |
| 8,644,634 B2 | * | 2/2014 | Wu | G01M 11/0292 356/124.5 |
| 9,098,147 B2 | * | 8/2015 | Chang | G06K 9/00 |
| 9,654,696 B2 | * | 5/2017 | Attar | H04N 5/23229 |
| 2003/0063212 A1 | * | 4/2003 | Watanabe | H04N 5/232123 348/E5.045 |
| 2004/0165090 A1 | * | 8/2004 | Ning | H04N 9/04519 348/E5.045 |
| 2008/0239136 A1 | * | 10/2008 | Kanai | H04N 5/232123 348/340 |

(Continued)

FOREIGN PATENT DOCUMENTS

CN 102769763 11/2012

*Primary Examiner* — Aaron W Carter
(74) *Attorney, Agent, or Firm* — JCIPRNET

(57) ABSTRACT

A lens matching apparatus and a lens matching method are provided. In the method, respective modulation transfer function (MTF) values corresponding to multiple focus lengths of each lens are obtained, a maximum MTF value among the focus lengths of each lens is determined, and lenses are classified according to the maximum MTF value. Each MTF value is determined based on at least one first pixel having maximum light intensity and at least one second pixel having minimum light intensity. Accordingly, the lenses with the same clearness may be classified into the same group, so as to improve image-stitching and speed up the image-stitching.

16 Claims, 3 Drawing Sheets respective MTF values corresponding to focus lengths of each lens is obtained — S210 maximum MTF value among focus lengths of each lens is determined — S230 lenses are classified according to maximum MTF value of each lens — S250

(56) References Cited

U.S. PATENT DOCUMENTS

| | | | |
|---|---|---|---|
| 2010/0016965 A1* | 1/2010 | Hong | A61F 2/1613 623/6.37 |
| 2010/0134754 A1* | 6/2010 | Hong | G02C 7/028 623/6.11 |
| 2012/0078586 A1* | 3/2012 | Alon | H04N 5/225 703/1 |
| 2012/0140110 A1* | 6/2012 | Makigaki | H04N 5/23209 348/E5.045 |
| 2012/0162486 A1* | 6/2012 | Asakura | H04N 5/217 348/241 |
| 2014/0002675 A1* | 1/2014 | Duparre | H04N 17/002 348/187 |
| 2017/0230595 A1* | 8/2017 | Ono | H04N 5/2254 |
| 2018/0270364 A1* | 9/2018 | Hirayama | H04N 1/00045 |
| 2019/0243095 A1* | 8/2019 | Chang | G02B 7/09 |
| 2019/0246016 A1* | 8/2019 | Chang | H04N 5/33 |
| 2020/0389598 A1* | 12/2020 | Takao | G02B 17/0808 |
| 2021/0072519 A1* | 3/2021 | Lin | G02B 5/20 |
| 2021/0192706 A1* | 6/2021 | Cheng | G06V 10/751 |

* cited by examiner

LENS MATCHING APPARATUS AND LENS MATCHING METHOD

CROSS-REFERENCE TO RELATED APPLICATION

This application claims the priority benefit of Taiwan application serial no. 108146788, filed on Dec. 19, 2019. The entirety of the above-mentioned patent application is hereby incorporated by reference herein and made a part of this specification.

BACKGROUND

Technical Field

The disclosure relates to a technology relevant to camera assembly, and in particular to a lens matching apparatus and a lens matching method.

Description of Related Art

There are more and more applications on the market that use more than two lenses. For example, two images are combined into one to form an image with 3D effect or for image-stitching. It is worth noting that the images seen by the human eyes through the two lenses should be similar in terms of clearness. Therefore, the two lenses need to be seen as having the same clearness during the lens design process. If the corresponding clearness of the two lenses is not the same, then the effect of the final image outputted will be affected. In addition, if the images captured by the two lenses need to be further stitched, then the difference in clearness will make it difficult to find corresponding feature points in the two images and the 3D image registration will cause the viewer to feel dizzy.

In some conventional designs, lenses of the same type and the same resolving power are paired to the same set of image output apparatus. However, through such pairing method, the final image outputted still has significant differences in terms of clearness.

SUMMARY

In view of the above, the disclosure provides a lens matching apparatus and a lens matching method, which determines a final focus length based on a maximum modulation transfer function (MTF) value and groups lenses after a gluing treatment according to corresponding clearness, so that the clearness and depth of field in the same group are almost the same.

The lens matching method according to the embodiment of the disclosure is applicable to multiple lenses and includes, but is not limited to, the following steps. Respective MTF values corresponding to multiple focus lengths of each lens are obtained. A maximum MTF value among the focus lengths of each lens is determined and the lenses are classified according to the maximum MTF value of each lens. Each MTF value is determined based on at least one first pixel having maximum light intensity and at least one second pixel having minimum light intensity.

The lens matching apparatus according to the embodiment of the disclosure is applicable to multiple lenses and includes, but is not limited, to a storage and a processor. The storage is configured to store multiple modules. The processor is coupled to the storage, and loads and executes the modules stored by the storage. The modules include an MTF determination module and a classification module. The MTF determination module obtains respective MTF values corresponding to multiple focus lengths of each lens and determines a maximum MTF value among the focus lengths of each lens. Each MTF value is determined based on at least one first pixel having maximum light intensity and at least one second pixel having minimum light intensity. The classification module classifies the lenses according to the maximum MTF value of each lens.

Based on the above, the lens matching apparatus and the lens matching method according to the embodiments of the disclosure determine the maximum MTF value (also referred to as peak value) corresponding to each lens and obtain a final focus length for the gluing treatment within a tolerance range. Finally, the embodiments of the disclosure classify the lenses after the gluing treatment according to the corresponding MTF value, so that the lenses with the same clearness may be classified into the same group, so as to improve image-stitching and speed up the image-stitching.

To make the aforementioned and other features of the disclosure more comprehensible, several embodiments accompanied with drawings are described in detail as follows.

DETAILED DESCRIPTION OF DISCLOSED EMBODIMENTS

Figure 1:
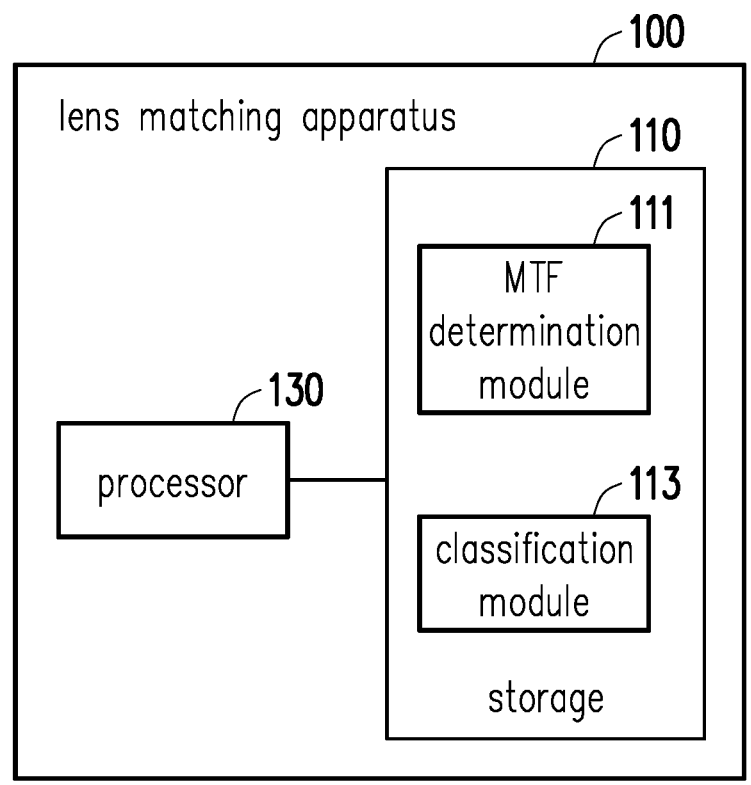
FIG. 1 is a block diagram of elements of a lens matching apparatus according to an embodiment of the disclosure.

FIG. 1 is a block diagram of elements of a lens matching apparatus 100 according to an embodiment of the disclosure. Referring to FIG. 1, the lens matching apparatus 100 includes, but is not limited, to a storage 110 and a processor 130. The lens matching apparatus 100 may be an electronic apparatus such as a desktop computer, a notebook computer, a server, a smartphone, a tablet computer, etc.

The storage 110 may be any type of fixed or removable random access memory (RAM), read-only memory (ROM), flash memory, traditional hard disk drive (HDD), solid-state drive (SSD), similar elements, or a combination of the above elements. In the embodiment of the disclosure, the storage 110 is configured to store temporary or permanent data (for example, focus length and modulation transfer function (MTF) value, MTF value, final focus length, sampling ratio, tolerance rate, etc.), software modules (for example, MTF determination module 111, classification module 113, etc.), or other files and data, and the detailed content thereof will be described in subsequent embodiments.

The processor 130 is electrically coupled to the storage 110 and the processor 130 may be a central processing unit (CPU), other programmable general-purpose or specific-purpose microprocessor, digital signal processor (DSP), programmable controller, application-specific integrated circuit (ASIC), other similar elements, or a combination of the above elements. In the embodiment of the disclosure, the processor 130 is configured to execute all or most of the operations of the lens matching apparatus 100, and load and execute various software modules, files, and data recorded by the storage 110.

In order to facilitate understanding of the operation process of the embodiments of the disclosure, several embodiments will be exemplified in detail below to illustrate the design and matching process of the lenses according to the embodiments of the disclosure. Hereinafter, the method described in the embodiments of the disclosure will be illustrated in conjunction with various elements and modules in the lens matching apparatus 100. The various procedures of the method may be adjusted according to the implementation situation and are not limited herein.

Figure 2:
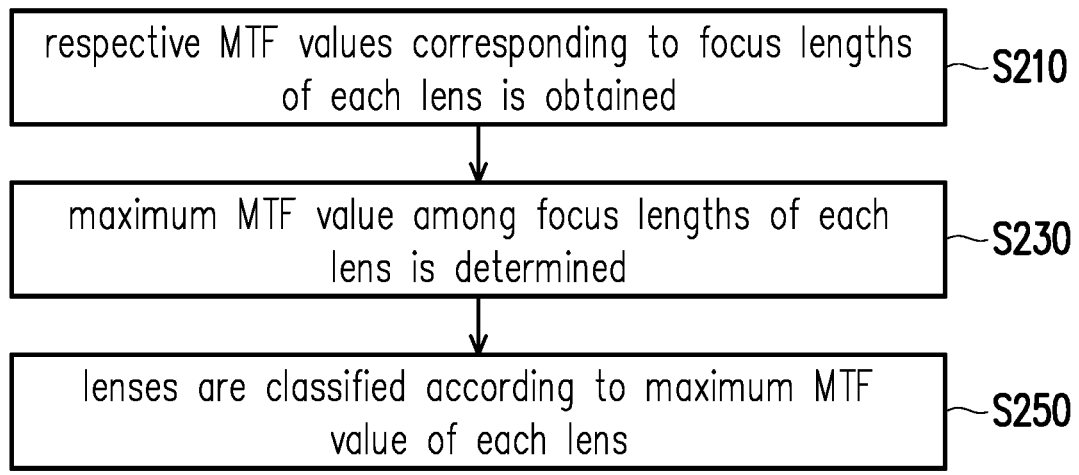
FIG. 2 is a flowchart of a lens matching method according to an embodiment of the disclosure.

FIG. 2 is a flowchart of a lens matching method according to an embodiment of the disclosure. Referring to FIG. 2, the MTF determination module 111 obtains respective MTF values corresponding to multiple focus lengths of each lens from the storage 110 or an external apparatus (for example, flash drive, server, hard disk, or other electronic apparatus) (Step S210). Specifically, the formula of an MTF is as follows:

$$(Max-Min)/(Max+Min) \quad (1),$$

where Max is a maximum light intensity and Min is a minimum light intensity. The corresponding MTF values of each lens at different focus lengths (for example, distances between a lens and a sensor) may be obtained based on (but not limited to) the following conditions: obtaining a front depth of field, a back depth of field, and depth of field information corresponding to different object distances based on specifications of each lens and selecting the object distance for testing. For example, in the case where an object distance is 50 cm, a certain lens has a front depth of field of 324 mm and an infinite back depth of field, which means that when the object distance is 50 cm, the clearness should be about 30 cm to infinity. A black-and-white contrast trellis diagram (or other black-and-white alternating lines and block diagram) placed at the object distance is shot using different lenses, the distance between the lens and the sensor (i.e., focus length) is changed, and the MTF values corresponding to different focus lengths are recorded.

In an embodiment, for each lens, the processor 130 may select the channel with the most stable MTF values from an R channel, a G channel, a B channel, and an Y channel thereof. Specifically, the R, G, and B channels are respectively outputs corresponding to red, green, and blue in the Bayer raw data of the sensor. The output of the Y channel is, for example, a calculation result of 0.2125×light intensity of the R channel+0.7154×light intensity of the G channel+ 0.0721×light intensity of the B channel. The processor 130 may judge whether the channels jitter (for example, variation less than a specific value) at the highest frequency.

Figure 3:
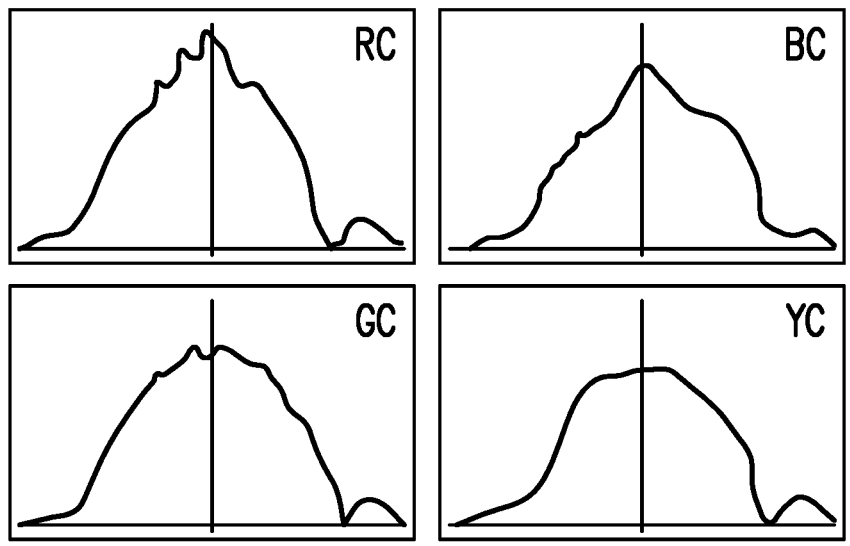
FIG. 3 is an example illustrating a clearness and focus length comparison chart of RGBY channels.

For example, FIG. 3 is an example illustrating a clearness and focus length comparison chart of RGBY channels. Referring to FIG. 3, the horizontal axis in the drawing represents the focus length (macro distance (or close distance) starts from left to right and finally approaches infinity) and the vertical axis represents the clearness (or MTF value). In the example, the clearness of an Y channel YC is less jittery at the highest frequency compared to an R channel RC, a G channel GC, and a B channel BC. In the example, the MTF determination module 111 may obtain the MTF values of each lens in the Y channel.

It should be noted that the characteristics of different lenses in different channels may be different. In other embodiments, the MTF determination module 111 may also obtain the MTF values of the lens in other channels (for example, the R, G, or B channel).

It is worth noting that in the prior art, the black-and-white contrast sampling is usually used to record the values (for example, MTF values or light intensity) at middle and corner (or edge) positions of the image. For the application of image-stitching, since a corner region in the image is used for stitching, the clearness at the corner is more important and the clearness at corners of two images being the same is relatively important.

In Formula (1) of the MTF value, the maximum light intensity and the minimum light intensity may respectively correspond to a certain pixel (for example, first pixel having the maximum light intensity and second pixel having the minimum light intensity).

In another embodiment, the MTF determination module 111 selects multiple pixels according to a sampling ratio to determine the maximum light intensity and the minimum light intensity. In the embodiment, each MTF value is determined based on multiple first pixels having the maximum light intensity and multiple second pixels having the minimum light intensity. Table (1) is an example illustrating variabilities of three certain lenses of different sampling ratios:

TABLE 1

| Sampling ratio | 60% | 70% | 80% |
|---|---|---|---|
| First lens | 6.54 | 6.40 | 6.96 |
| Second lens | 7.35 | 7.22 | 7.25 |
| Third lens | 7.17 | 6.70 | 7.27 |

It can be seen from Table (1) that the variabilities of different sampling ratios are different. In order to obtain relatively stable values, the embodiment of the disclosure selects a specific number of pixels and the corresponding values thereof to obtain the MTF value representing the focus length.

In an embodiment, the MTF determination module 111 determines multiple first pixels according to a first sampling ratio and determines multiple second pixels according to a second sampling ratio. The first pixels are a number of pixels (for example, first highest light intensity, second highest light intensity, etc.) corresponding to the first sampling ratio selected from multiple image pixels (for example, pixels in the image obtained by the sensor through the lens sensing the light and shadow of the outside) sorted by degree of light intensity. Also, the second pixels are a number of pixels (for example, first lowest light intensity, second lowest light intensity, etc.) corresponding to the second sampling ratio selected from the image pixels. Taking Table (1) as an example, the variability of the sampling ratio at 70% is relatively small and the MTF determination module 111 may determine the first sampling ratio as 15% and the second sampling ratio as 15%. Assuming that 1600 pixels have the largest value and 1600 pixels have the smallest value, then the first pixels have a total of 1600×15% pixels (240 pixels) and the second pixels have a total of 1600×15% pixels (240 pixels).

It should be noted that the values of the sampling ratios, the first and second sampling ratios, in the example are only for exemplification and may be changed according to the actual situation (for example, for any lens, the sampling ratio having a relatively small variability is determined; or, obtained from a comparison chart or a specific function). The first and second sampling ratios are not necessarily equal.

Then, the MTF determination module 111 may determine the MTF value of a focus length of a certain lens according to light intensity of the first pixels and light intensity of the second pixels. In other words, the MTF determination module 111 determines a maximum intensity of the MTF (for example, maximum light intensity Max in Formula (1)) according to light intensity of multiple first pixels and determines a minimum intensity of the MTF (for example, minimum light intensity Min in Formula (1)) according to light intensity of multiple second pixels. For example, the MTF determination module 111 may use the mean, median, mode, or other representative values of light intensity of the first pixels as the maximum light intensity Max in Formula (1) and use the mean, median, mode, or other representative values of light intensity of the second pixels as the minimum light intensity Min in Formula (1). Then, the MTF determination module 111 may substitute modified maximum and minimum light intensities into Formula (1) and take the calculation result as the MTF value.

In some embodiments, for the output of a specific channel, the MTF determination module 111 adopts the first and second sampling ratios to select the first and second pixels; and for other specific outputs, the MTF determination module 111 selects only a single first pixel and a single second pixel. For example, if the output of the G channel is relatively stable, then the MTF determination module 111 selects only a single first pixel and a single second pixel; and if the output of the Y channel is relatively stable, then the MTF determination module 111 adopts the first and second sampling ratios to select multiple first and second pixels.

In response to the need for consistency at the corners of the image, in an embodiment, the MTF determination module 111 may select light intensity of pixels at the corner regions and determine the MTF values of the corner regions accordingly. In other embodiments, in response to the need for consistency at different positions of the image (for example, center, four corners, etc.), the MTF determination module 111 may also select light intensity of pixels corresponding to the positions and obtain the corresponding MTF values accordingly.

After obtaining the MTF values corresponding to different focus lengths of each lens, referring to FIG. 2, the MTF determination module 111 determines a maximum MTF value among the focus lengths of each lens (Step S230). Specifically, the contrast is usually considered when finding a focus point corresponding to the optimal clearness of the lens. The higher the contrast, the better the clearness at such distance. Also, the optimal focus points for different lenses may be different. In the prior art, the designer usually selects the optimal focus point according to the specifications provided by the supplier. For example, the focus length corresponding to the MTF value exceeding a specific threshold. However, even for the same type of lenses, the MTF values measured may be different, such that the optimal focus point obtained according to a conventional method may also be different.

In the embodiment of the disclosure, the optimal focus point is determined according to the focus point corresponding to the maximum MTF value. There are many types of methods for finding the maximum MTF value. In an embodiment, for the MTF values corresponding to different focus lengths of each lens, the MTF determination module 111 may sequentially compare the MTF values (for example, focus lengths of adjacent orders are 0.01 mm, 0.005 mm, etc. apart) corresponding to next-order focus lengths from a macro distance position and determine whether the MTF value corresponding to the next-order focus length is greater. If the MTF value corresponding to the next-order focus length is greater, then the MTF determination module 111 continues to compare the MTF values corresponding to the next-order and subsequent focus lengths until the value no longer increases. If the value starts to decrease, the MTF determination module 111 may obtain the maximum MTF value (that is, peak value).

In another embodiment, the MTF determination module 111 may also use a numerical sorting algorithm (for example, bubble sort, selection sort, insertion sort, etc.) to obtain the maximum MTF value. It should be noted that the embodiment of the disclosure does not limit the measure for finding the maximum MTF value, and methods such as function, comparison table, etc. may also be applied.

It is worth noting that the MTF values of the lens may change after a gluing treatment. In an embodiment, the MTF determination module 111 determines a final focus length for the gluing treatment of each lens according to a tolerance rate and the maximum MTF value. The tolerance rate is relevant to variables (for example, characteristics relevant to the gluing treatment such as glue characteristics, baking temperature, baking time, etc.) of the gluing treatment. The tolerance rate is, for example, a value between 1% and 5%, but may also vary according to actual requirements. The MTF determination module 111 uses the focus length corresponding to a value within the tolerance rate of the maximum MTF value as the final focus length used for the gluing treatment.

Figure 4:
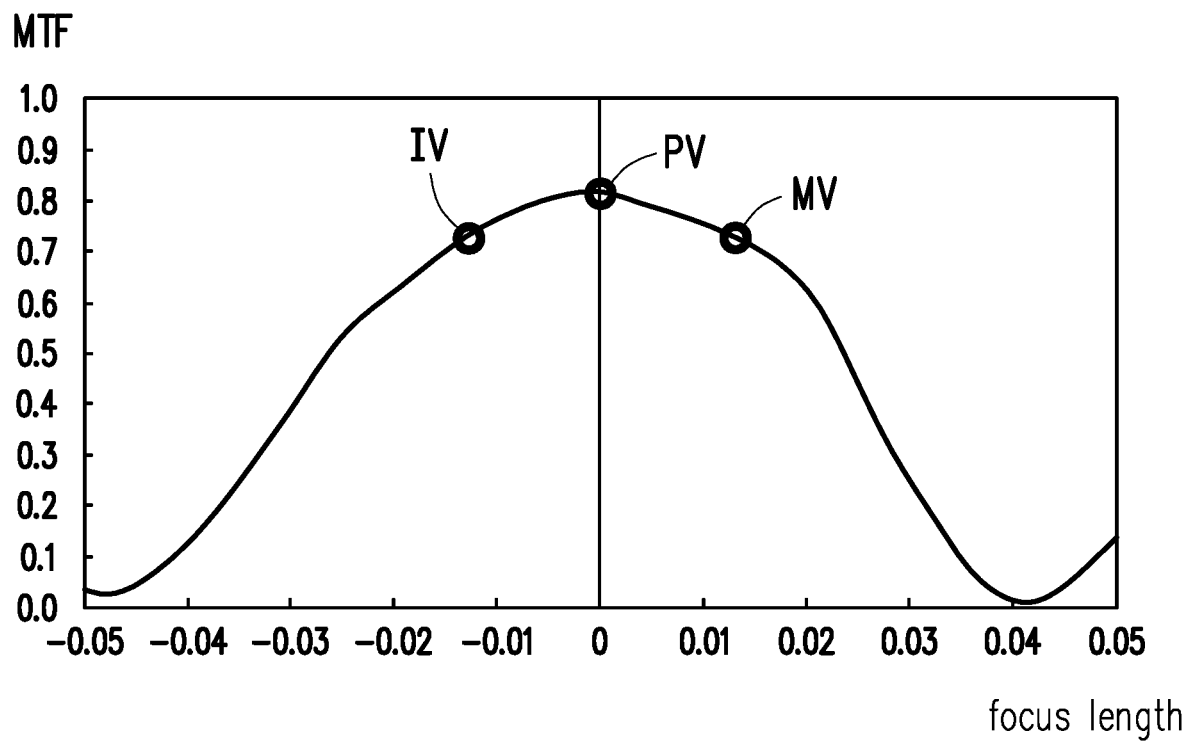
FIG. 4 is an example illustrating an MTF value and focus length comparison chart of a certain lens.

For example, FIG. 4 is an example illustrating an MTF value and focus length comparison chart of a certain lens. Referring to FIG. 4, assuming that a peak focus length value PV has the maximum MTF value of 0.82 and the tolerance rate is around 5%, then a value of 0.78 (corresponding to tolerable focus lengths IV and MV) may be selected.

It is worth noting that the value selected may correspond to two focus lengths. In an embodiment, the final focus length is closer to infinity than the focus length corresponding to the maximum MTF value. Specifically, based on experimental results, the lens after the gluing treatment causes the curve of the MTF value to shift toward macro distance due to baking. Taking FIG. 4 as an example, the drawing tends to infinity on the left and tends to macro distance on the right, and the MTF determination module 111 may select the tolerable focus length IV as the final focus length for the gluing treatment.

In another embodiment, the final focus length may also be closer to macro distance than the focus length corresponding to the maximum MTF value. Taking FIG. 4 as an example, the MTF determination module 111 may select the tolerable focus length MV as the final focus length for the gluing treatment.

In some embodiments, the MTF determination module 111 may also directly use the focus length corresponding to the maximum MTF value as the final focus length for the gluing treatment. Taking FIG. 4 as an example, the MTF determination module 111 may select the peak focus length value PV as the final focus length for the gluing treatment.

Then, each lens may be glued according to the final focus length thereof. In an embodiment, the MTF determination module 111 may compare the MTF values of the lens after the gluing treatment with a corresponding maximum MTF value and confirm whether to adjust the corresponding maximum MTF value according to the comparison result. If the comparison result is that the difference between the two values is greater than a difference threshold, then it means that there is doubt in the determination of the previous maximum MTF value and the maximum MTF value needs to be found again. If the comparison result is that the difference between the two values is not greater than the difference threshold, then there is no need to find the maximum MTF value again.

Referring to FIG. 2, the classification module 113 may classify the lenses according to the maximum MTF value of each lens (Step S250). In an embodiment, after the gluing treatment is completed, the classification module 113 may record the MTF values (the focus lengths used are obtained according to the maximum MTF value) of the lenses after the gluing treatment and classify two or more lenses with a difference between two MTF values less than a range threshold into the same group. For example, if the range threshold is 0.1, then the MTF values corresponding to the two lenses are respectively 0.79 and 0.8, that is, the two lenses may be classified into the same group. For another example, the MTF values of the two lenses must be the same in order to be classified into the same group.

In another embodiment, the classification module 113 may also record the maximum MTF values of the lenses and classify the lenses based on the degree of difference between the maximum MTF values of the lenses.

It is worth noting that the lenses classified into the same group may be selected and further integrated into an apparatus such as a stereo camera, a panoramic camera, a penetrative head-mounted display, or other apparatus integrated from multiple lenses.

In summary, in the lens matching apparatus and the lens matching method according to the embodiments of the disclosure, the maximum MTF value of each lens is found and the focus length for the gluing treatment is selected within the range of the tolerance rate. Then, the lenses may be classified according to the MTF values. Accordingly, the clearness and depth of field of the lenses classified into the same group are the same or almost the same and the image-stitching and the speed of the image-stitching can be improved.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lens matching method, applicable to a plurality of lenses, the lens matching method comprising:
   obtaining respective modulation transfer function (MTF) values corresponding to a plurality of focus lengths of each of the lenses, wherein each of the MTF values is determined based on at least one first pixel having maximum light intensity and at least one second pixel having minimum light intensity;
   determining a maximum MTF value among the plurality of focus lengths of each of the lenses; and
   classifying the plurality of lenses according to the maximum MTF value of each of the lenses.

2. The lens matching method according to claim 1, wherein the step of obtaining respective MTF values corresponding to a plurality of focus lengths of each of the lenses comprises:
   determining a plurality of first pixels according to a first sampling ratio, wherein the plurality of first pixels are a number of pixels corresponding to the first sampling ratio selected from a plurality of image pixels sorted by degree of light intensity;
   determining a plurality of second pixels according to a second sampling ratio, wherein the plurality of second pixels are a number of pixels corresponding to the second sampling ratio selected from the plurality of image pixels; and
   determining an MTF value of one of the focus lengths of a lens according to light intensity of the plurality of first pixels and light intensity of the plurality of second pixels, wherein a maximum intensity of an MTF is determined according to light intensity of the plurality of first pixels and a minimum intensity of the MTF is determined according to light intensity of the plurality of second pixels.

3. The lens matching method according to claim 1, wherein the step of obtaining respective MTF values corresponding to a plurality of focus lengths of each of the lenses comprises:
   obtaining an MTF value of each of the lenses in an Y channel.

4. The lens matching method according to claim 3, wherein the Y channel is less jittery at a highest frequency compared to an R channel, a G channel, and a B channel.

5. The lens matching method according to claim 1, wherein the step of determining the maximum MTF value among the plurality of focus lengths of each of the lenses comprises:
   sequentially comparing each of the MTF values with another MTF value of an adjacent focus length until one of the MTF values no longer increases.

6. The lens matching method according to claim 1, wherein the step of classifying the plurality of lenses according to the maximum MTF value of each of the lenses comprises:
   determining a final focus length for a gluing treatment of each of the lenses according to a tolerance rate and the maximum MTF value, wherein the tolerance rate is relevant to variables of the gluing treatment;
   comparing an MTF value of one of the lenses after the gluing treatment with a corresponding maximum MTF value; and
   confirming whether to adjust the corresponding maximum MTF value according to a comparison result.

7. The lens matching method according to claim 6, wherein the final focus length is closer to infinity than a focus length corresponding to the maximum MTF value.

8. The lens matching method according to claim 1, wherein the step of classifying the plurality of lenses according to the maximum MTF value of each of the lenses comprises:
   recording MTF values of the plurality of lenses after a gluing treatment; and
   classifying at least two lenses with a difference between two MTF values less than a range threshold into a same group.

9. A lens matching apparatus, applicable to a plurality of lenses, the lens matching apparatus comprising:
   a storage, storing a plurality of modules; and
   a processor, coupled to the storage, and loading and executing the plurality of modules, wherein the plurality of modules comprises:
     an MTF determination module, for obtaining respective MTF values corresponding to a plurality of focus lengths of each of the lenses and determining a maximum MTF value among the plurality of focus lengths of each of the lenses, wherein each of the MTF values is determined based on at least one first pixel having maximum light intensity and at least one second pixel having minimum light intensity; and a classification module, for classifying the plurality of lenses according to the maximum MTF value of each of the lenses.

10. The lens matching apparatus according to claim 9, wherein the MTF determination module determines a plurality of first pixels according to a first sampling ratio, determines a plurality of second pixels according to a second sampling ratio, and determines an MTF value of one of the focus lengths of one of the lenses according to light intensity of the plurality of first pixels and light intensity of the plurality of second pixels, wherein the plurality of first pixels are a number of pixels corresponding to the first sampling ratio selected from a plurality of image pixels sorted by degree of light intensity and the plurality of second pixels are a number of pixels corresponding to the second sampling ratio selected from the plurality of image pixels.

11. The lens matching apparatus according to claim 9, wherein the MTF determination module obtains an MTF value of each of the lenses in an Y channel.

12. The lens matching apparatus according to claim 11, wherein the Y channel is less jittery at a highest frequency compared to an R channel, a G channel, and a B channel.

13. The lens matching apparatus according to claim 9, wherein the MTF determination module comparing each of the MTF values with another MTF value of an adjacent focus length until one of the MTF values no longer increases.

14. The lens matching apparatus according to claim 9, wherein the MTF determination module determines a final focus length for a gluing treatment of each of the lenses according to a tolerance rate and the maximum MTF value, compares an MTF value of one of the lenses after the gluing treatment with a corresponding maximum MTF value, and confirms whether to adjust the corresponding maximum MTF value according to a comparison result, wherein the tolerance rate is relevant to variables of the gluing treatment.

15. The lens matching apparatus according to claim 14, wherein the final focus length is closer to infinity than a focus length corresponding to the maximum MTF value.

16. The lens matching apparatus according to claim 9, wherein the classification module records MTF values of the plurality of lenses after the gluing treatment and classifies at least two of the lenses with a difference between two MTF values less than a range threshold into a same group.

* * * * *